PULSE-CODE MODULATION DEVICE

Filed Sept. 15, 1954 4 Sheets-Sheet 1

INVENTORS
FRANK DE JAGER
JAN FREDERIK SCHOUTEN
BY Fred M. Vogel
AGENT

Dec. 10, 1957 F. DE JAGER ET AL 2,816,267

PULSE-CODE MODULATION DEVICE

Filed Sept. 15, 1954 4 Sheets-Sheet 2

INVENTORS
FRANK DE JAGER
JAN FREDERIK SCHOUTEN
BY Fred M. Vogel
AGENT

INVENTORS
FRANK DE JAGER
JAN FREDERIK SCHOUTEN
BY Fred M. Vogel
AGENT

INVENTORS
FRANK DE JAGER
JAN FREDERIK SCHOUTEN
BY Fred M. Vogel
AGENT

United States Patent Office 2,816,267

Patented Dec. 10, 1957

2,816,267

PULSE-CODE MODULATION DEVICE

Frank de Jager and Jan Frederik Schouten, Eindhoven, Netherlands, assignors to Hartford National Bank and Trust Company, Hartford, Conn., as trustee Application September 15, 1954, Serial No. 456,129

Claims priority, application Netherlands September 28, 1953

6 Claims. (Cl. 332—11)

Figures 1A, 1B, 2A, 2B:
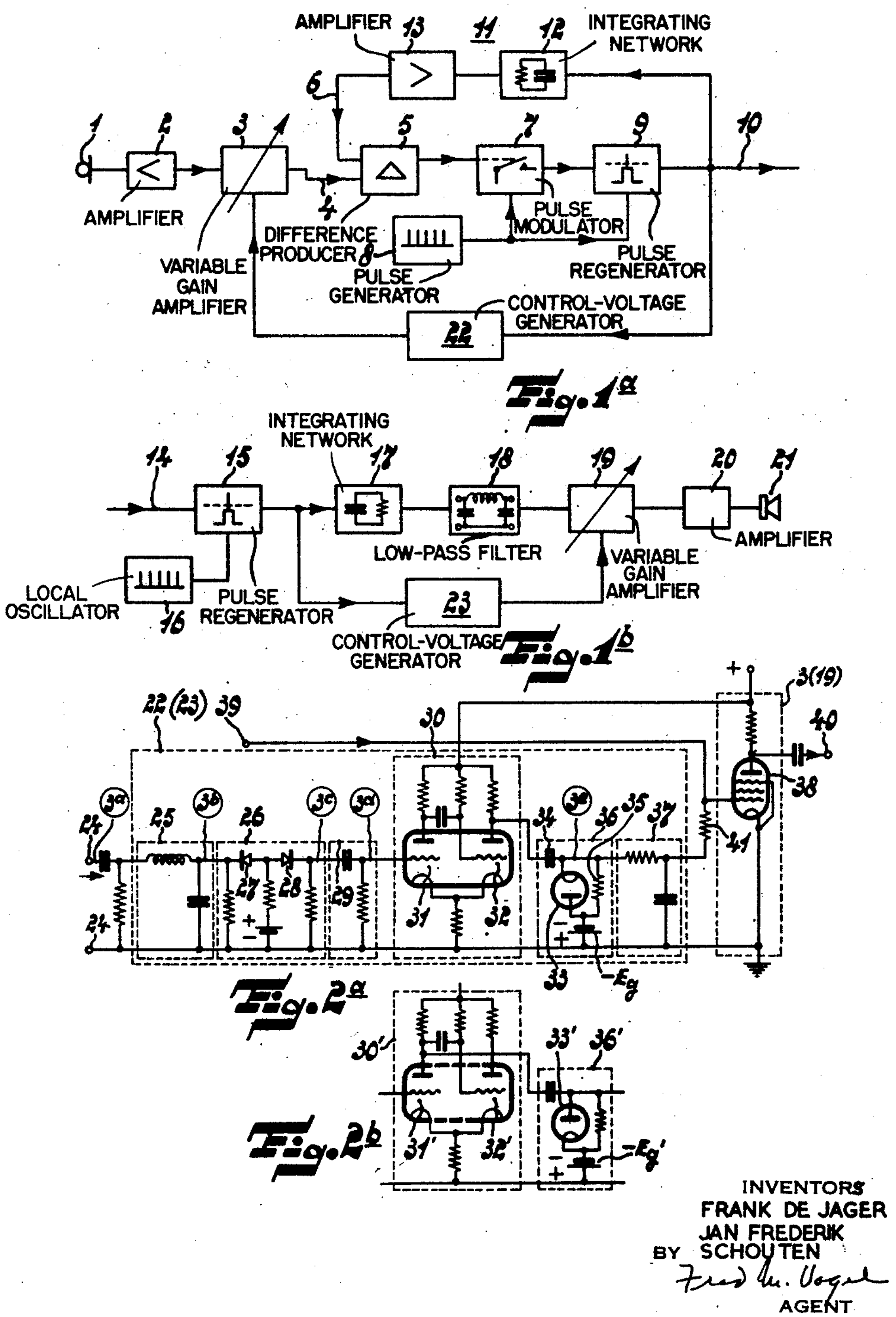

The invention relates to a device comprising a transmitter and/or receiver for the transmission of signals, more particularly continuously varying signals, for example speech signals, music signals, television signals and the like by delta pulse-code modulation, in which code pulses derived from a pulse-code modulator are present or absent in a sequence of "1" and "0" pulses varying with the intelligence signals.

With pulse code modulation for the transmission of signals divergences occur owing to the quantisized amplitude transmission between the signal voltage reproduced at the receiver end and the initial signal voltage, these divergences producing the so-called quantisation noise. Accordingly, as an amplitude quantum represents a smaller fraction of the maximum signal voltage, the ratio between signal and quantisation noise improves. However, independently of the type of pulse code modulation, an improvement in this ratio obtained in the aforesaid manner requires an increase in the maximum repetition frequency of the code pulses to be transmitted, or in other terms, in an increase in the bandwidth required for the transmission.

It is known that particularly in the case of a comparatively low signal voltage or low signal level the quantisation noise has a disturbing effect.

In order to reduce the disturbing effect of quantisation noise in the case of a low signal level in the transmission of signals by means of a binary multi-unit code, the signals may be fed to the code modulator at the transmitter end through an amplifier having an amplification factor decreasing exponentially with an increasing instantaneous value of the signals (instantaneous compression). At the receiver end the signals obtained after decodification must be passed through an amplifier for instantaneous expansion in order to nullify the instantaneous compression introduced in the transmitter. (cf. Bell System Technical Journal, Jan. 1948, pages 6, 7 and 28).

It should be noted that instantaneous compression produces signal distortion and hence the occurrence of harmonics transmitted with the signal frequencies; this is undesirable, since it would indeed require an increase in bandwidth.

With the type of one unit-pulse code modulation to which the invention relates, i. e. with delta pulse code modulation as described extensively in Philips Technisch Tijdschrift September 1951, pages 249 to 258 and in U. S. Patent No. 2,662,118, issued December 8, 1953, and referred to briefly as delta modulation, the use of instantaneous compression and expansion as described in the said patent specification is also effective in restricting the disturbing influence of quantisation noise at a low signal level. Of course, the said disadvantage of instantaneous compression appears also in this case.

The object of the invention is to provide means which may be employed with delta modulation to reduce effectively the disturbing effect of quantisation noise with a low signal level. If desired, these new means may be combined with a moderate instantaneous compression and expansion.

According to the invention, in a device of the kind referred to above for dynamic control of the signals use is made of a level control-device to be controlled by a level control-voltage and of a control-voltage generator fed by the code puses; this control-voltage generator comprises a polarity alternation detector to convert the polarity alternations characterised in the code pulses by the occurrence of 01 or 10 pulse pairs into measuring pulses, the mean frequency of which varies with the extent of the control of the code modulator and a frequency detection stage fed by these measuring pulses to convert the measuring pulses into a direct control-voltage varying with the mean frequency of the measuring pulses and serving as a level control-voltage; to this end the output of the frequency detector stage is coupled to the level control-voltage input of the level control-device.

As will be set out more fully hereinafter with reference to a few embodiments a dynamic control is thus carried out in accordance with the invention by means of a level control-voltage derived from the code pulse sequence characterising the intelligence signals, in principle, on the basis of a frequency information contained in the code pulse sequence. This frequency information is substantially independent of transmission interferences between the transmitter and the receiver, so that at the transmitter end and at the receiver end identical level control-voltages can be obtained. The said frequency information varies with the degree of excitation of the code modulator employed at the transmitter end, i. e. with the ratio between the signal level and useful control-range of the code modulator. By using a level control-voltage proportional to the degree of excitation of the code modulator in order to compress the signals fed to the pulse-code modulator through the level control-device, the modulator receives invariably a signal level which is favourable to the amplitude quantisation process. At a low level of the signals to be transmitted the quantisation noise at the receiver end has no longer a disturbing effect subsequent to expansion corresponding to the compression at the transmitter end. The ratio between the signals and the quantisation noise remains substantially constant.

It should be noted herein that it is known with signal transmission devices by means of a given binary multi-unit code to derive a level control-voltage from the occurrence of the first and the second pulse of each code group in the form of 00 or 11 or else 01 or 10.

The invention will be described with reference to the accompanying drawing.

Figs. $1^a$ and $1^b$ show in a block diagram a transmitter and a receiver respectively according to the invention for delta modulation.

Figs. $2^a$ and $2^b$ show a first detailed embodiment of control-voltage generators to be used in the devices shown in Fig. 1, the operation of these generators being explained with reference to the voltage-time diagrams of Figs. $3^a$ to $3^e$.

Figure 4:
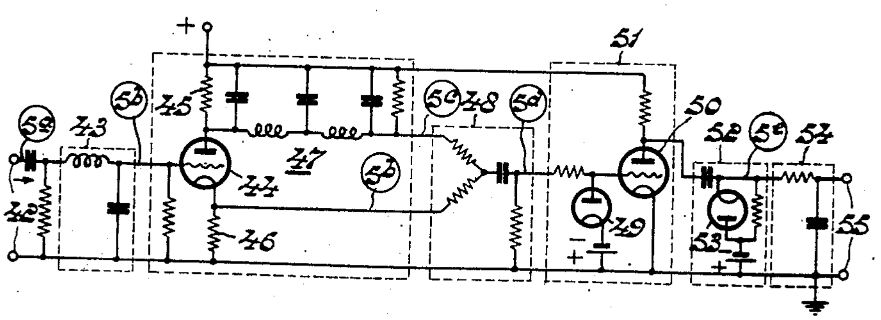

Figs. 4 and $5^a$ to $5^e$ show a second detailed embodiment of a control-voltage generator to be used with delta modulation and the associated voltage-time diagrams.

Figures 6B, 7:
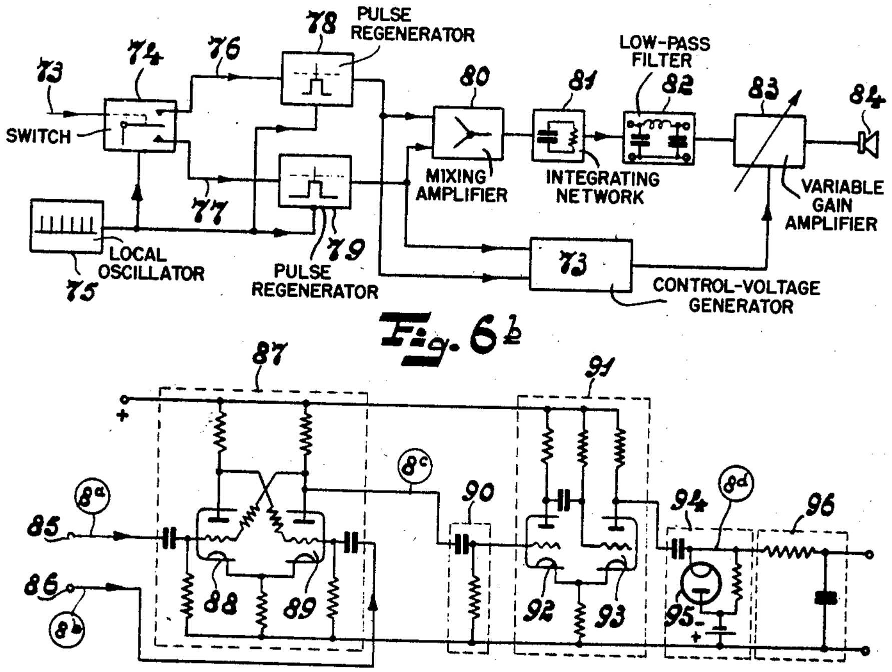

Figs. $6^a$ and $6^b$ show in a block diagram a particular embodiment of a transmitter and a receiver respectively for delta modulation and Figs. 7, $8^a$ to $8^d$ show a suitable embodiment of a control-voltage generator to be used in this system and voltage-time diagrams to explain the operation thereof.

In the transmitter for delta modulatoin shown in a block diagram in Fig. $1^a$ speech signals derived from a microphone 1 are supplied through a microphone amplifier 2 and a level control-device 3, constructed for example in the form of an amplifier of variable conductance, through a conductor 4 to a difference producer 5. To this difference producer 5 is also supplied through a conductor 6 a comparison signal obtained in a manner to be described hereinafter. Difference voltages occurring across the output of the difference producer 5 control a pulse modulator 7, connected to a pulse generator 8 which produces equidistant pulses having a repetition frequency which may for example be ten times the maximum signal frequency to be transmitted.

In accordance with the polarity of the output voltage of the difference producer 5, pulses from pulse generator 8 occur at the output of the pulse modulator 7 or they are suppressed (or reversed in polarity or supplied to an additional output). Pulses passing through pulse modulator 7 are referred to hereinafter as 1-pulses, whereas the pulses suppressed (or reversed in polarity or occurring at the additional output) are referred to as 0-pulses.

To the output of the pulse modulator 7, which supplies 1- and 0-pulses, is connected a pulse generator 9 in order to suppress variations produced in the pulse modulator with respect to amplitude, duration, waveform or time of the pulses. The regeneration may for example to performed by replacing the pulses supplied by pulses derived directly from the pulse generator 8. The regenerated pulses are emitted through a conductor 10 either directly or modulated on a carrier wave. These pulses are moreover supplied to a return circuit 11 including a network 12 integrating signal frequencies and an amplifier 13 connected thereto. In the return circuit 11 is produced the aforesaid comparison voltage which is supplied through the conductor 6 to the difference producer 5.

The circuit 5 to 13 described above constantly tends to reduce the output voltage of the difference producer 5 to zero, the comparison signal derived from the return circuit 11 thus constituting a quantitative approximation of the input signal; viewed in a time diagram, this comparison voltage fluctuates about the input signal in a rhythm varying with the pulse repetition frequency. It should be noted that with delta modulation contrary to other types of pulse code modulation to be described hereinafter the code pulses characterize the instantaneous value of the signal to be transmitted at equidistant instants. Code pulses are emitted which characterize the polarity only at a transmission instant of the difference between the instantaneous value of the signal and the comparison signal corresponding to the instantaneous value of the signal to be transmitted at the immediately preceding transmission instant and derived from the return circuit. Thus the code pulses characterize a signal value primarily depending on the steepness of the signal wave.

Fig. 1b shows a receiver to be used in association with the transmitter shown in Fig. 1a. The received distorted pulses at conductor 14 are replaced by locally produced pulses by means of a pulse regenerator 15 connected to a local oscillator 16 to be synchronized with the pulse generator 8 of the transmitter. The regenerated pulses are supplied to a signal-frequencies integrating network 17, corresponding to the integrating network 12 in the return circuit of the transmitter, so that at the output of the integrating network 17 is produced a signal corresponding to the comparison signal in the transmitter. Through a low-pass filter 18, which passes the desired speech frequency band and which suppresses frequencies exceeding this band, the signal is supplied to a level control-device 19. The signals derived therefrom and corresponding to the initial speech signals are reproduced, subsequent to amplification (20) by a loudspeaker 21. Transmitters and receivers for delta modulation of the kind described above are described in the aforesaid patent specification and U. S. Patent No. 2,745,063, issued May 8, 1956.

We now proceed to the explanation of the dynamic control to be carried out in accordance with the invention in a transmitter and a receiver as shown in Figs. 1a and 1b.

In the absence of an input signal in the transmitter shown in Fig. 1a the return circuit supplies to the difference producer 5 a comparison voltage which, viewed in a time diagram, fluctuates about the zero level. The pulse modulator 7 supplies a pulse sequence characterizing the zero level and being of the type —10101010—, wherein consequently every other pulse from pulse generator 8 is suppressed owing to the alternating polarity of the difference voltage fed to the pulse modulator. The pulse combination 01 and 10 thus represent each a change of polarity and are referred to hereinafter as "reversals." The number of reversals in the pulse sequence characterizing the zero level —10101010— equals the repetition frequency of the pulses from the pulse generator 8 or in other terms is equal to the maximum repetition frequency of the emitted pulses.

If a voltage moderately increasing or decreasing with time is applied to the transmitter, the pulse modulator produces pulse sequences of the type —11010111011— or —100101000100— respectively. The number of reversals in these pulse sequences is smaller than with the pulse sequence characterizing the zero level.

Upon the supply of a signal wave having a maximum permissible positive or negative steepness the pulse modulator 7 produces sequences of the type —11111111— and —00000000— respectively, wherein reversals do not occur at all.

After the foregoing it will be obvious that the number of reversals occurring within a certain period of time in the pulse sequence or else the mean frequency of reversals is a measure for the excitation of the pulse modulator; at a low signal level the mean frequency of the reversals approaches the maximum pulse repetition frequency, whereas at a maximum permissible signal level it exhibits a considerably lower value. According to the invention this property is utilized to obtain a dynamic control-voltage from the code pulses characterizing the signals to be transmitted.

In the transmitter shown in Fig. 1a and in the receiver shown in Fig. 1b the code pulses characterizing the signal and occurring across conductors 10 and 14 are supplied to a control-voltage generator 22 and 23 respectively. These generators, the details of which will be described hereinafter, are preferably substantially identical. They supply a direct control-voltage varying with the mean frequency of the reversals in the code pulse sequence supplied, this control-voltage being supplied to the level control-devices 3 and 19 respectively with a polarity such that in the transmitter compression of the signals and in the receiver an expansion neutralizing the compression is obtained.

In the transmitter is carried out a backward control, in the receiver a forward control, which provides great freedom in the choice of the control-time constants. Of course, the control-time constant must be chosen so that during its period a sufficiently large number of pulses occurs to permit the derivation of a control-voltage. With delta modulation frequently very small control-time constants are permissible in this respect. Otherwise the minimum control-time constant must be such that the control-voltage does not introduce audible, non-linear distortions. In transmission of speech this involves a control-time constant of for example 1/50 to 1/200 sec. With more rapid level control attention must be paid to variations in the direct current components. When control-tubes are used, use is then preferably made, as is known, of tube connections balanced for the control-voltage or else use may be made of a network of non-linear cells, as used in telephony compound systems.

A few embodiments of control-voltage generators to be used will now be described.

Fig. 2ª shows a first embodiment of a control-voltage generator (22 in Fig. 1ª), to be used at the transmitter end the operation of which generator will be explained with reference to the voltage-time diagrams of Figs. 3ª to 3ᵉ.

Figure 3:
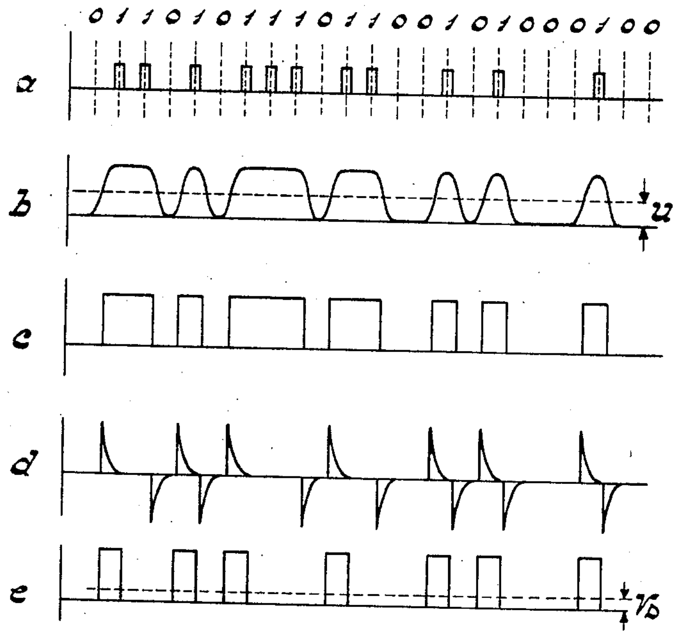

A signal supplied to the pulse modulator 7 of Fig. 1 having an amplitude favourable to the amplitude-quantisizing process, is characterized by a code-pulse sequence of the type shown in Fig. 3ª. The detection of the reversals characterizing the excitation of the code modulator is carried out as follows. The code pulse sequence is supplied via input terminals 24 (Fig. 2ª) to a low-pass filter 25, the cut-off frequency of which is approximately equal to half the maximum pulse repetition frequency. By this special choice of the cut-off frequency the filter 25 produces a broadening of the individual pulses and immediately successive pulses unite to produce a single pulse as shown in Fig. 3ᵇ. The edges of these broadened pulses coincide with the occurrence of the pulse combinations 01 and 10 of Fig. 3ª.

The pulses thus obtained are converted, by means of a suitably biassed two-way limiter 26, comprising germanium diodes 27 and 28 connected with opposite sense in series, into rectangular pulses as shown in Fig. 3ᶜ. The fronts of these pulses coincide with the instants when the slanting edges of the pulses of Fig. 3ᵇ pass the limit level U in upward or downward direction. The differentiation of the pulses of Fig. 3ᶜ by means of a differentiating network 29 following directly the limiter yields pulse pairs having a positive and a negative sharp pulse as is shown in Fig. 3ᵈ. The positive and the negative pulses correspond to the pulse combinations 01 and 10 respectively.

To the output of the differentiating network 29 is connected a mono-stable trigger circuit 30, comprising a double triode 31, 32. At the reception of a positive pulse (varying in waveform and in amplitude, as the case may be) a positive rectangular measuring pulse is produced at the anode of the triode 32, the duration and amplitude of this pulse being predetermined; the duration of these measuring pulses varies with the time constant of the trigger circuit 30 and is chosen to be substantially equal to the minimum interval of the pulse pairs supplied. The basis of the measuring pulses is fixed on a constant direct voltage value by means of a diode 33, biassed by a battery voltage $-E_g$, in conjunction with a series capacitor 34 and a parallel resistor 35. The latter elements form together a network 36, fixing the direct voltage level and are of known type. At the output of this network occurs the sequence of positive measuring pulses of Fig. 3ᵉ, each of which coincides with a reversal, represented by the pulse combination 01, in the code pulse sequence of Fig. 3ª. The mean frequency of the measuring pulses varies as does the mean frequency of the pulse combination 01, with the excitation of the code modulator. In order to obtain a control-voltage proportional to this mean frequency, the mean direct-voltage component is derived from the measuring pulses by means of a smoothing filter 37, employed in this case as a frequency detector stage. The direct voltage $V_D$ thus obtained, shown in Fig. 3ᵉ, is proportional to the mean frequency of the sign alternations in the code pulse sequence and is used to control the level of the signals supplied to the difference producer 5 of Fig. 1 by means of the level control-device 3.

According to Fig. 2ª the level control-device 3 comprises a pentode 38 having variable conductance. The signals to be transmitted are fed to an input terminal 39, connected to the control-grid of the pentode; the amplified signals are derived through the output terminal 40 from the anode circuit of the pentode 38. The control-grid circuit of the pentode 38 includes a grid resistor 41, the aforesaid smoothing filter 37 and the network 36 in order to fix the direct-voltage level. The operative control-grid bias voltage of pentode 38 is composed of a fixed control-voltage bias voltage $-E_g$ from the bias voltage battery in the network 36 and the variable part $V_D$, i. e. the direct-current component of the measuring pulses.

At low excitation of the pulse modulator 7 of Fig. 1 the mean frequency of the reversals in the code pulse sequence obtained is comparatively high; the voltage $V_D$ is then comparatively high, so that the total negative grid bias voltage of pentode 38 is comparatively low and hence the amplification is high. Weak input signals thus reach the pulse modulator, owing to the high amplification then obtained in the level control-device 3, with a level favourable to the excitation of the pulse modulator.

At a high level of the input signals the control-voltage $V_D$ is low owing to the low mean frequency of the reversals in the code pulse sequence, so that the amplification of the level control-device 3 is also low.

When using the control-pentode 38, the conductance of which varies exponentially with the grid voltage, the control is effected in an interval of e. g. 28 db in the case of a variation in the operative negative grid bias voltage between for example $-40$ v. and $-10$ v. The compression thus obtained at the transmitter end in conjunction with a corresponding expansion at the receiver end suffices in the case of normal transmission of speech to reduce the quantisation noise in the receiver output by about 20 db in the case of a low signal level in comparison to the quantisation noise at a high signal level, so that a very efficient reduction of the quantisation noise at low signal levels is obtained.

Fig. 2ᵇ shows what modifications are to be applied in the control voltage generator of Fig. 2ª to use it at the receiver end for dynamic expansion.

To the input terminals of the control-voltage generator of Fig. 1ᵇ are supplied as before the code pulses. The low-pass input filter 25, the two-way limiter 26 and the differentiating network 29 are maintained without modification in the control-voltage generator in the receiver. The trigger circuit 30 of Fig. 2ª is replaced by a trigger circuit 30′ of Fig. 2ᵇ which differs from the former only in that the output pulses are taken from the triode 31 instead of from triode 32. The measuring pulses then derived from the trigger circuit have negative polarity. The network 36′ following the trigger circuit 30′ to fix the direct voltage level of the basis of the measuring pulses differs from the network 36 in that the diode 33 is inversed as is shown at 33′, whilst at the same time the negative bias voltage $-E'_g$ is materially lower than $-E_g$. The direct voltage component of the measuring pulses obtained in the network 36′ now has a negative polarity and thus contributes to the bias voltage $-E'_g$. The output voltage of the network 36′ is, as in Fig. 2ª, supplied through smoothing filter 37 to the control-grid of a control-pentode in the level control-device 19. The increase in the direct-current component of the measuring pulses now produces a reduction in amplification of the control-pentode 36 to compensate the dynamic compression at the transmitter end.

Fig. 4 shows a second embodiment of a control-voltage generator in detail, wherein the reversals and the detection are carried out in a different manner; the operation of this generator will be explained with reference to voltage-time diagrams of Fig. 5.

Figures 5, 6A:
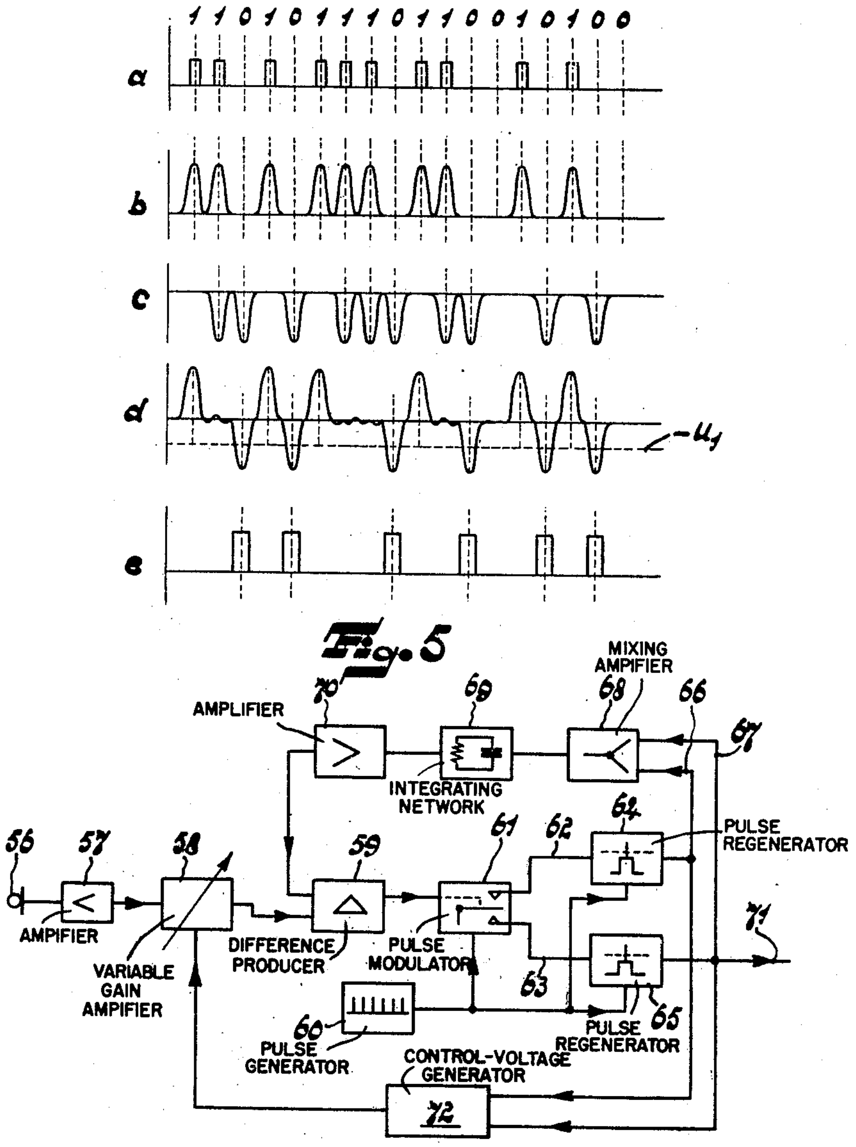

The code pulses shown in Fig. 5ª are fed to the input terminals 42 of the control-voltage generator of Fig. 4. For this embodiment of the control-voltage generator it is desirable to convert the rectangular input pulses into pulses of slightly rounded waveform. To this end the input pulses are supplied through a low-pass filter 43, the cut-off frequency of which slightly exceeds the maximum pulse repetition frequency. The pulses derived from this filter are shown in Fig. 5ᵇ. These rounded pulses control a triode 44 having two approximately equal output resistors 45 and 46, included in the anode conductor and the cathode conductor respectively of the triode 44. The pulses across the anode resistor 45 have negative polarity and are supplied to a delaying network 47 having sections, the cut-off frequencies of which are equal to the cut-off frequency of the filter 43. At the output of the delaying network 47 occur negative pulses (Fig. 5$^c$) which are delayed for a period of one pulse interval relatively to the positive pulses (Fig. 5$^b$) across the cathode resistor 46.

Positive pulses derived from cathode resistor 46 and delayed negative pulses are supplied to an addition network 48, so that a voltage of the kind shown in Fig. 5$^d$ is obtained. Whenever a non-delayed and a delayed pulse coincide, substantially no output voltage occurs after addition. The pulse combination 10, subsequent to the addition of delayed and non-delayed pulses, produces a negative-going pulse; in a similar manner the pulse combination 01 produces a positive-going pulse. The pulses across the output of the addition network are shown in Fig. 5$^d$.

Of those of Fig. 5$^d$ only the negative-going pulses are utilized in the further circuit arrangement by supplying the pulses obtained through a negatively biassed limiting diode 49 to the control-grid of a triode 50 of a limiting stage 51. Whenever a negative-going pulse exceeds in a negative direction the limiting level $-u_1$ of Fig. 5$^d$, a positive measuring pulse is produced at the anode of the triode 50. With a suitable choice of the operative control-grid space of the triode 50 the measuring pulses obtained are substantially rectangular, as is shown in Fig. 5$^e$.

The direct-voltage level of the basis of the measuring pulses, as in the embodiment of the control-voltage generator of Fig. 2$^a$, is fixed by means of a network 52 having a biassed diode 53, the direct-current component to be used as a control-voltage being then derived by means of a smoothing filter 54 from these measuring pulses. At the output terminals 55 of the smoothing filter 54 occurs a variable voltage which, as in the embodiment of Fig. 2$^a$, may be used directly as a control-grid bias voltage for a control-pentode or a different level control-device reacting upon a varying direct voltage.

In the embodiments of devices for delta modulation so far described use was made of a pulse modulator (7 in Fig. 1$^a$) which allows equidistant pulses to pass only in the case of positive polarity of the difference voltage controlling the modulator. In the case of negative polarity of the difference voltage, the pulses are suppressed.

Figs. 6$^a$ and 6$^b$ show a transmitter and a receiver for delta modulation respectively; at the transmitter end the equidistant pulses are supplied in accordance with the polarity of the difference voltage to a first or a second output of the modulator. The 1-pulses and the 0-pulses consequently occur across different output conductors of the modulator. In the receiver shown in Fig. 6$^b$ the 1- and the 0-pulses also occur separately in a similar manner.

The transmitter shown in Fig. 6$^a$ comprises a microphone 56, connected to a microphone amplifier 57. The output of the microphone amplifier 57 is connected through a level control-device 58 to one of the inputs of a difference producer 59. The difference voltage derived therefrom controls a pulse modulator 61, connected to a generator 60 for equidistant pulses, the modulator having output conductors 62 and 63. The pulse modulator 61 comprises a change-over contact, which is shown in a block diagram form. In the transmission of speech signals, in view of the necessary high operating frequency then required, the modulator 61 can of course be formed substantially only by an electronic switch, for example of a cathode-ray tube having an electron beam which strikes one of the two output electrodes in accordance with the polarity of the difference voltage derived from the difference producer 59. Pulse modulators of this kind are known from Fig. 5 of the aforesaid U. S. Patent No. 2,662,118.

The 1- and the 0-pulses occurring across conductors 62 and 63 control pulse regenerators 64 and 65, which serve to suppress variations of the pulses derived from modulator 61. As before, this is carried out by replacing the pulses fed to the regenerators by pulses taken directly from pulse generator 60. The regenerated pulses are fed through conductors 66 and 67 to a combination amplifier 68, the 1- and the 0-pulses occurring with opposite polarity across the output of this amplifier. This output is connected to a signal frequency integrating network 69, at the output of which occurs a voltage amplified by the amplifier 70 and employed as a comparison voltage. This comparison voltage is fed to the difference producer 59, to which are also applied the signals to be transmitted.

The operation of the delta modulation transmitter of Fig. 6$^a$ corresponds to that of the transmitting device of Fig. 1$^a$; also in this case the circuit including the difference producer 59 and the pulse modulator 61, in conjunction with the return circuit 68 to 70 shunting these elements, tends to reduce the output voltage of the difference producer 59 to zero. Only now the comparison voltage is obtained by the integration of 1- and 0-pulses of opposite polarity, so that the comparison signal has a stepwise course.

For transmitting the signals only the 0-pulses taken from the pulse generator 65 are emitted through the conductor 71, since these pulses contain all information about the signal.

According to the invention, in order to excite the transmitting device always to an extent which is favourable to the amplitude quantisizing process, a dynamic control-voltage is obtained by means of a control-voltage generator 72, connected to the outputs of the pulse regenerators 64 and 65, this generator controlling the level control-device 58 to compress the signals to be transmitted. A suitable embodiment of the control-voltage generator 72 will be explained with reference to Fig. 7.

Fig. 6$^b$ shows a receiver to be employed in association with a transmitter as shown in Fig. 6$^a$ for delta modulation.

The incoming pulses occur across conductor 73 and control a switch having a change-over contact 74 of the type analogous to the pulse modulator 61 of Fig. 6$^a$. Equidistant pulses from the local pulse generator 75, synchronized with the pulse generator 60 of the transmitter, are fed through the switch 74 to the output conductors 76 and 77 in accordance with the presence or absence of a 0-pulse across conductor 73. At the reception of a 0-pulse a locally produced pulse is fed to the conductor 77; in the absence of an incoming pulse at a given instant a locally produced pulse is fed to the conductor 76. The 1- and 0-pulses occurring across conductors 76 and 77 are regenerated by means of the pulse regenerators 78 and 79, connected to the local pulse generator 75 and fed to the combination amplifier 80. As in the combination amplifier 68 in the return circuit of the transmitter, the output of the combination amplifier 80 has produced across it 1- and 0-pulses of opposite polarity, which produce a signal corresponding to the comparison signal in the transmitter subsequent to integration by means of a network 81, integrating the signal frequencies. The signal thus obtained is supplied through a low-pass filter 82, suppressing all frequencies exceeding the speech-frequency band, and through a level control-device 83 to a loudspeaker 84. The level control-device 83 serves for expansion of the incoming signals and neutralizes the compression of the signals produced by the level control-device 58 in the transmitter of Fig. 6$^a$. The control-voltage required for the level control-device 83 is derived in a manner similar to that in the transmitter shown in Fig. 6$^a$ from the 1- and the 0-pulses characterizing the transmitted signal by means of a control-voltage generator 73. The inputs of this control-voltage generator 73 are connected to the outputs of the pulse regenerators 78 and 79.

A suitable embodiment of the control-voltage generator 72 of Fig. 6$^a$, wherein the detection of the reversals is carried out in a manner differing from that of the control-voltage generators hitherto described of Figs. 2 and 4, is shown in Fig. 7; the operation of this generator is explained with reference to the voltage-time diagrams of Figs. 8a to 8d.

Figure 8:
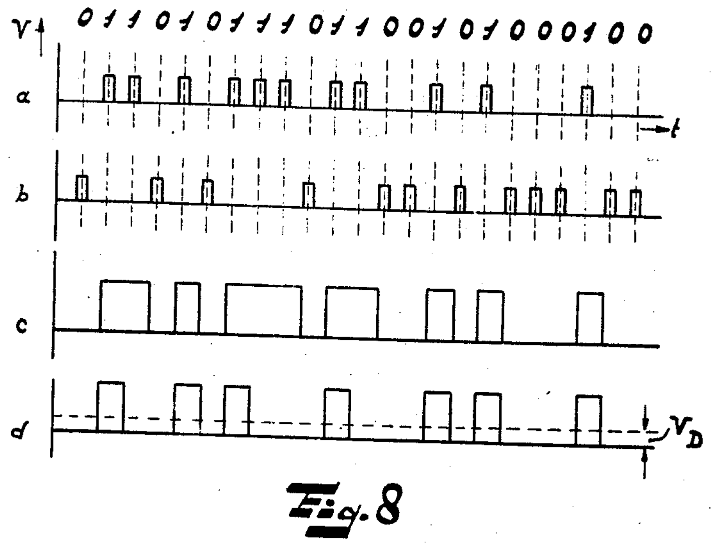

The 1- and the 0-pulses derived from pulse regenerators 64 and 65 are shown in Figs. 8a and 8b respectively and are fed via input terminals 85 and 86 respectively to the control-voltage generator of Fig. 7. The 1- and the 0-pulses control in opposite senses a bistable trigger circuit 87 comprising triodes 88 and 89 coupled for direct current, by supplying the 1-pulses to the control-grid of triode 88 and the 0-pulses to the control-grid of triode 89. As soon as a 1-pulse is fed via the input terminal 85 to the triode 88, this triode will become conductive and remain conductive independent of the 1-pulses occurring subsequently, until a 0-pulse is supplied to the triode 89 via the input terminal 86. Thereupon the trigger circuit 87 changes over to the other position of equilibrium, since triode 89 becomes conductive. Thus, owing to the 1- and 0-pulses of Figs. 8a and 8b, the pulsatory voltage of Fig. 8c is produced at the anode of triode 89, the edges of this voltage coinciding with the reversals in the code pulse sequence characterizing the signal. Whenever a pulse combination 01 occurs, an ascending edge is produced; at the occurrence of the pulse combination 10, a descending edge is produced.

The pulses of Fig. 8c control a monostable trigger circuit 91 comprising triodes 92 and 93 through a differentiating network 90, producing sharp pulses coinciding with the edges of the input pulses. Whenever a positive sharp pulse comes in, a rectangular measuring pulse of constant duration and amplitude is produced; this pulse is derived with positive polarity from the anode of triode 93. By means of the network 94 comprising a biassed diode 95 the direct-current level of the basis of these measuring pulses is fixed and thus the sequence of measuring pulses of Fig. 8d is obtained. The mean direct-current component $V_D$ derived therefrom by means of a low-pass filter 96 is suitable for dynamic control-voltage to control the level control-device 58 in the transmitter of Fig. 6a.

The control-voltage generator 73 to be employed in the receiver of Fig. 6b is constructed preferably in the manner shown in Fig. 7. Attention must be paid to the opposite polarity of the control-voltage required in the receiver, so that the control-voltage generator of Fig. 7 must be modified for the receiver in the manner described with reference to Fig. 2b, where the control-voltage generator of Fig. 2a served as a basis.

It will be obvious that in transmitters and receivers of the kind shown in Figs. 6a and 6b it is not absolutely necessary to use a control-voltage generator to which 1- and 0-pulses are supplied separately. Use may be made of control-voltage generators of the kind described with reference to Figs. 2a, 2b and 4, to which only 1- or 0-pulses are supplied.

In order to convert the frequency characterising the excitation of the code modulator into a direct control-voltage use is made in the embodiments so far described of a smoothing filter constituted by an RC-network. It will, however, be obvious, that the conversion of the variations of the said frequency datum into a direct control-voltage may be carried out in a different manner. Use may for example be made of a circuit tuned to the maximum pulse repetition frequency, this circuit being excited by measuring pulses. The amplitude of the oscillations across this circuit is a measure for the excitation of the code modulator.

What is claimed is:

1. A delta-pulse code-modulation signal-transmission device comprising a signal source, a pulse source, a pulse code modulator connected to receive signals and pulses from said sources and produce code pulses in the form of 1-pulses and 0-pulses, the occurrence of individual ones of said code pulses being dependent upon said signals, and a dynamic control-voltage generator for controlling the amplitude of said signals and comprising a polarity-alternation detector connected to receive said code pulses and produce measuring pulses in accordance with alternations of said code pulses in the sequence of 0–1 or 1–0, a frequency detector stage connected to receive said measuring pulses and produce a direct control voltage varying with variations in the mean frequency of occurrence of said measuring pulses, and a level control-device connected to control the amplitude level of said signals in accordance with the value of said control voltage.

2. A device as claimed in claim 1, in which said frequency detector stage comprises a smoothing filter having a time-constant large enough to convert said measuring pulses into said direct control voltage.

3. A device as claimed in claim 2, in which a biased diode circuit is connected to the output of said polarity-alternation detector in order to fix the direct-voltage amplitude level of said measuring pulses.

4. A device as claimed in claim 1, in which said polarity-alternation detector comprises a low-pass filter connected to receive said code pulses and having a cut-off frequency equal to at least one-half of the maximum repetition frequency of said code pulses, a voltage limiter connected to convert the output voltage of said filter into a substantially rectangular-shaped voltage, a differentiating network connected to produce sharp differentiated pulses coinciding with the leading and trailing edges of said rectangular-shaped voltage, and a pulse generator connected to said differentiating network to produce measuring pulses of consistent amplitude and duration in accordance with the occurrences of said differentiated pulses.

5. A device as claimed in claim 1, in which said polarity-alternation detector comprises a low-pass filter connected to receive said code pulses and having a cut-off frequency substantially equal to the maximum repetition frequency of said code pulses, a delay network connected to receive the output voltage of said filter and delay this voltage by a period equal to one interval between said code pulses, an adding network connected to add the output voltage of said filter to the delayed said output voltage with opposite polarities thereby to produce said measuring pulses, and a voltage limiter connected to limit the amplitude of said measuring pulses.

6. A device as claimed in claim 1, in which said polarity-alternation detector comprises a bistable trigger circuit controlled in its respective states by said 1-pulses and 0-pulses, respectively, to produce a substantially rectangular voltage the edges of which coincide with alternations in the sequence of said code pulses, a differentiating network connected to produce sharp differentiated pulses coinciding with the leading and trailing edges of said rectangular voltage, and a pulse generator connected to produce measuring pulses of consistent amplitude and duration in accordance with the occurrences of said differentiated pulses.

References Cited in the file of this patent

UNITED STATES PATENTS

| | | |
|---|---|---|
| 2,568,721 | Deloraine et al. | Sept. 25, 1951 |
| 2,610,252 | Fuller | Sept. 9, 1952 |